United States Patent
Aoyama (10) Patent No.: US 7,862,643 B2
(45) Date of Patent: Jan. 4, 2011

(54) HYDROGEN SEPARATION MEMBRANE AND FUEL CELL, AND MANUFACTURING METHOD THEREFOR

(75) Inventor: Satoshi Aoyama, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 1064 days.

(21) Appl. No.: 11/578,582

(22) PCT Filed: Apr. 7, 2005

(86) PCT No.: PCT/JP2005/007270

§ 371 (c)(1),
(2), (4) Date: Oct. 16, 2006

(87) PCT Pub. No.: WO2005/102918

PCT Pub. Date: Nov. 3, 2005

(65) Prior Publication Data

US 2007/0248874 A1    Oct. 25, 2007

(30) Foreign Application Priority Data

Apr. 26, 2004   (JP) ............................. 2004-129441

(51) Int. Cl.
*B01D 53/22*   (2006.01)
(52) U.S. Cl. ............................. 95/56; 95/55; 96/4; 96/7; 96/11; 55/523; 55/524; 55/DIG. 5; 427/331; 427/372.2; 427/115; 423/648.1; 423/651; 502/325; 502/339; 502/527.12; 429/411

(58) Field of Classification Search ...................... 96/4, 96/7, 11; 95/55, 56; 55/523, 524, DIG. 5; 427/331, 372.2, 388.1, 115; 423/648.1, 651; 502/325, 339, 527.12, 439; 429/411
See application file for complete search history.

(56) References Cited

U.S. PATENT DOCUMENTS 5,393,325 A * 2/1995 Edlund ........................... 95/56
5,498,278 A * 3/1996 Edlund ........................... 96/11
5,645,626 A   7/1997 Edlund et al.

(Continued)

FOREIGN PATENT DOCUMENTS

EP   0 652 042 A1   5/1995

(Continued)

OTHER PUBLICATIONS

David Edlund et al., Hydrogen-permeable metal membranes for high-temperature gas separations, in Gas & Purification, vol. 8, No. 3, pp. 131-136, 1994.

(Continued)

*Primary Examiner*—Jason M Greene
(74) *Attorney, Agent, or Firm*—Oliff & Berridge, PLC (57) ABSTRACT

A method of manufacturing a hydrogen separation membrane comprises the steps of forming an intermediate layer suitable for controlling oxidation of a hydrogen permeable metal layer on the surface of the hydrogen permeable metal layer on the surface of the hydrogen permeable metal used as a substrate; and attaching a catalytic metal in a granular form on the surface of the intermediate layer. This method can be used to manufacture a hydrogen separation membrane in which the quantity of catalytic metal used is controlled.

12 Claims, 4 Drawing Sheets

U.S. PATENT DOCUMENTS

| | | | |
|---|---|---|---|
| 6,152,955 A | 11/2000 | KenKnight et al. | |
| 6,214,090 B1 | 4/2001 | Dye et al. | |
| 6,235,417 B1 * | 5/2001 | Wachsman et al. | 429/17 |
| 6,572,683 B2 * | 6/2003 | Yoshida et al. | 96/11 |
| 6,649,559 B2 * | 11/2003 | Drost et al. | 95/56 |
| 6,761,755 B2 * | 7/2004 | Jantsch et al. | 96/11 |
| 6,964,697 B2 * | 11/2005 | Pan et al. | 96/11 |
| 2003/0061937 A1 | 4/2003 | Ito et al. | |
| 2003/0148884 A1 * | 8/2003 | Ito et al. | 502/339 |
| 2003/0213365 A1 | 11/2003 | Jantsch et al. | |
| 2004/0043277 A1 | 3/2004 | Ito et al. | |

FOREIGN PATENT DOCUMENTS

| | | |
|---|---|---|
| EP | 0 783 919 A1 | 7/1997 |
| EP | 1 048 614 A1 | 11/2000 |
| EP | 1 300 188 A2 | 4/2003 |
| EP | 1 334 764 A2 | 8/2003 |
| JP | A 4-345762 | 12/1992 |
| JP | A 5-299105 | 11/1993 |
| JP | A 7-185277 | 7/1995 |
| JP | A 2001-29761 | 2/2001 |
| JP | A-2003-225544 | 8/2003 |

OTHER PUBLICATIONS

Chinese Office Action for Application No. 200580013144.X; mailed Feb. 5, 2010 (with translation).

* cited by examiner

Fig.3

Prior Art

HYDROGEN SEPARATION MEMBRANE AND FUEL CELL, AND MANUFACTURING METHOD THEREFOR

TECHNICAL FIELD

The present invention relates to a hydrogen separation membrane for controlling the use of a catalytic metal for activating hydrogen dissociation and bonding, a fuel cell, and a manufacturing method therefor.

BACKGROUND ART

Conventionally, the hydrogen separation membrane described in JAPANESE PATENT LAID-OPEN GAZETTE No. 7-185277 described below, for example, is known as a hydrogen separation membrane having a function to separate only hydrogen from a hydrogen-rich gas used in a fuel cell or the like. For the hydrogen separation membrane indicated in this literature, a hydrogen permeable metal layer (vanadium (V)) is used as the substrate, and both sides thereof are coated with a metal diffusion control layer. Also, the surfaces of such metal diffusion control layers are coated with palladium (Pd) as a catalytic metal in a membrane form, and the catalytic metal activates and promotes dissociation and bonding of hydrogen (hereinafter the catalytic metal is referred to as a hydrogen dissociation and bonding catalytic metal).

The palladium (Pd) used as the hydrogen dissociation and bonding catalytic metal in the hydrogen dissociation membrane described above is expensive, so there is a demand to control the quantity of palladium (Pd) used as much as possible.

The problem described above is not limited to only palladium (Pd), but also concerns other metals used in hydrogen dissociation and bonding catalytic metal.

DISCLOSURE OF THE INVENTION

It is an object of the present invention to provide a hydrogen separation membrane for controlling the quantity of hydrogen dissociation and bonding catalytic metal used, and a fuel cell, and a manufacturing method therefor, taking into consideration the above-mentioned problem.

In order to attain at least part of the above and the other related objects, the present invention is directed to a method of manufacturing a hydrogen separation membrane. The manufacturing method comprises the steps of: (a) forming an oxidation control layer for controlling oxidation of a hydrogen permeable metal layer used as a substrate on a surface thereof, and (b) attaching catalytic metal having dissociation and bonding reactions of hydrogen activity in a granular form on a surface of the oxidation control layer.

According to the above-mentioned manufacturing method for a hydrogen separation membrane, a catalytic metal is attached in a granular form, so it is possible to increase the surface area of the active interface of the catalytic metal over the case where a conventional catalytic metal is formed in a membrane form. Consequently, if the surface area of the active interface is set to the same size as that of the active interface in the case where the catalytic metal is formed in a membrane form, for example, it is possible to control the quantity of catalytic metal used better than in the case where the catalytic metal is formed in a membrane form.

In the above-mentioned manufacturing method, the catalytic metal attached in the step (b) may be a hydrogen permeable metal.

Also, the above-mentioned manufacturing method may further comprise the step of: (c) a process is further provided for contouring the surface of the formed above-mentioned oxidation control layer. In the step (b), the catalytic metal having dissociation and bonding reactions of hydrogen activity may be caused to attach in a granular form to a surface of the irregular oxidation control layer.

If this is done, catalytic metal is made to attach to the irregular oxidation control layer in a granular form, so the surface area of the active interface of the catalytic metal can be increased over the case where the catalytic metal is formed in a membrane form along the surface of the irregular oxidation control layer. Consequently, if the surface area of the active interface is set to the same size as that of the active interface of the catalytic metal in the case where catalytic metal is formed in a membrane form along the surface of the irregular oxidation control layer, for example, it is possible to control the quantity of catalytic metal used better than in the case where the catalytic metal is formed in a membrane form.

If the above-mentioned oxidation control layer is handled as mentioned below, it can be formed irregularly.

That is, in accordance with one preferable application of the above-mentioned manufacturing method, in the step (a), the oxidation control layer is formed amorphously, and in the step (c), a surface of the oxidation control layer is formed irregularly by crystallizing the amorphous oxidation control layer.

If this is done, the amorphous oxidation control layer can be formed irregularly using the physical changes that occur during crystallization.

Also, in accordance with another preferable application of the above-mentioned manufacturing method, in the step (a), the oxidation control layer is formed by a metal oxide whose oxidation is incomplete, and in the step (c), the oxidation control layer is formed irregularly by oxidizing the oxidation control layer made from the metal oxide whose oxidation is incomplete.

If this is done, the oxidation control layer formed from metal oxide whose oxidation is incomplete can be formed irregularly using the physical changes that occur during oxidation.

In accordance with further another preferable application of the above-mentioned manufacturing method, in the step (a), the oxidation control layer is formed with pure metal, and in the step (c), the oxidation control layer is formed irregularly by oxidizing the oxidation control layer made from the pure metal.

If this is done, the oxidation control layer made from pure metal can be formed irregularly using the physical changes that occur during oxidation.

In order to attain at least part of the above and the other related objects, the present invention is directed to a method of manufacturing a fuel cell. The manufacturing method comprises the manufacturing method comprising the steps of: manufacturing the above-mentioned hydrogen separation membrane; and (d) forming an electrolyte layer having proton conductivity on a surface of the hydrogen separation membrane.

According to the manufacturing method for the above-mentioned fuel cell, a hydrogen separation membrane is used which can control the quantity of the above-mentioned catalytic metal used, so it is possible to control the cost of manufacturing a fuel cell.

In order to attain at least part of the above and the other related objects, the present invention is directed to a hydrogen separation membrane. The hydrogen separation membrane comprises a hydrogen permeable metal layer as a substrate; an oxidation control layer formed on a surface of the hydrogen permeable metal layer for controlling oxidation thereof; and a hydrogen dissociation bonding activity layer formed by attaching a catalytic metal with hydrogen dissociation and bonding reaction activity in a granular form on a surface of the oxidation control layer.

According to the above-mentioned hydrogen separation membrane, catalytic metal is attached in a granular form, so the surface area of the active interface of the catalytic metal can be increased more than in the case where a conventional catalytic metal is made in a membrane form. Consequently, if the surface area of the active interface is set to the same size as that of the active interface of the catalytic metal in the case where catalytic metal is formed in a membrane form, for example, it is possible to control the quantity of catalytic metal used better than in the case where the catalytic metal is formed in a membrane form.

In order to attain at least part of the above and the other related objects, the present invention is directed to a fuel cell. The fuel cell comprises the above-mentioned hydrogen separation membrane; and an electrolyte layer formed on a surface of the hydrogen separation membrane and having proton conductivity.

According to the above-mentioned fuel cell, a hydrogen separation membrane is used which can control the quantity of the above-mentioned catalytic metal used, so it is possible to control the cost of manufacturing a fuel cell.

BEST MODES FOR CARRYING OUT THE INVENTION

Modes for carrying out the present invention are described below based on embodiments in the below sequence.

A. Embodiment 1

A1. Manufacturing Method for a Hydrogen Separation Membrane
A2. Effects of the Embodiment B. Embodiment 2

B1. Manufacturing Method for a Hydrogen Separation Membrane
B2. Effects of the Embodiment C. Embodiment 3

C1. Manufacturing Method for a Hydrogen Separation Membrane
C2. Effects of the Embodiment D. Variants A. Embodiment 1

A1. Manufacturing Method for a Hydrogen Separation Membrane

Figure 1:
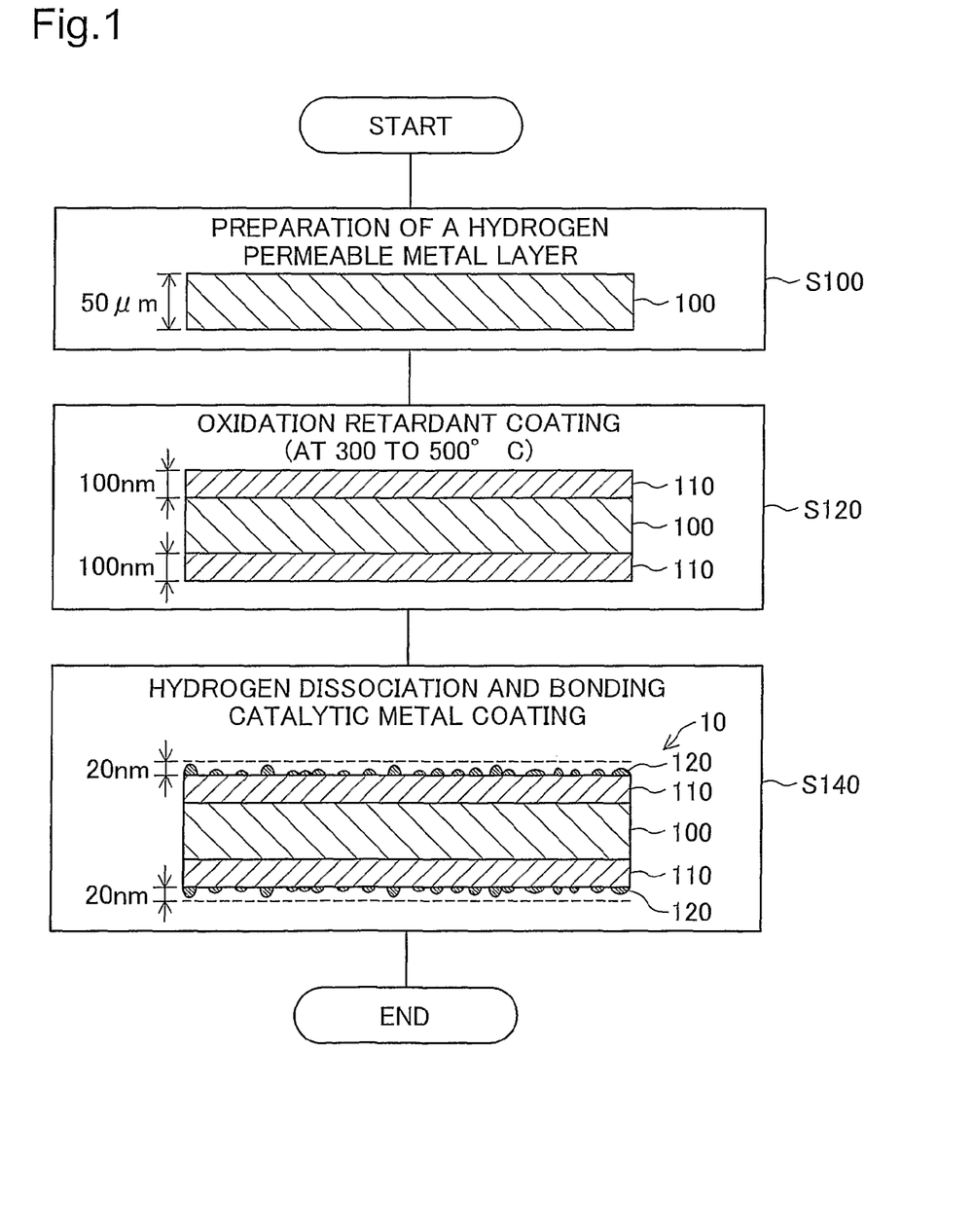
FIG. 1 is a flowchart showing the process for manufacturing a hydrogen separation membrane of Embodiment 1 of the present invention.

FIG. 1 is a flowchart showing the process for manufacturing a hydrogen separation membrane in Embodiment 1 of the present invention. Components and so forth formed in each process are illustrated in the flowchart.

A method for manufacturing a hydrogen separation membrane is described below as Embodiment 1 of the present invention using the flowchart shown in FIG. 1.

First, a hydrogen permeable metal layer 100 is prepared as a substrate. Hydrogen selectively passes through the hydrogen permeable metal layer 100 (step S100). Also, in the present embodiment, vanadium (V) is used as the hydrogen permeable metal layer 100 whose thickness is about 50 µm. The thickness may be arbitrarily set according to the use of the hydrogen separation membrane to be produced.

Next, an oxidation retardant for controlling oxidation of the hydrogen permeable metal layer 100, which is the substrate, is coated evenly on both sides thereof, forming an oxidation control layer 110 (step S120). An agent that allows hydrogen to pass through readily is used as the oxidation retardant. For example, tungsten trioxide ($WO_3$), molybdenum trioxide ($MoO_3$), a barium cerate ($BaCeO_3$) or a strontium cerate ($SrCeO_3$) ceramic perovskite (hereinafter, referred to as perovskite) ($ABO_3$), or $Sm_2Zr_2O_7$ or other ceramic pyrochlore (hereinafter referred to as pyrochlore) ($A_2B_2O_7$) may be used. Also, the coating of the oxidation retardant is carried out with a PVD method such as ion plating or sputtering, for example. It is desirable to apply the coating at a temperature of about 300 to 500° C. such that the oxidation retardant does not become amorphous. In the present embodiment, the thickness of the oxidation control layer 110 is about 100 nm. This thickness may be set arbitrarily according to the use of the hydrogen separation membrane to be produced. The oxidation control layer 110 has a function to control metal diffusion which can occur between vanadium (V) and a hydrogen dissociation and bonding catalytic metal 120 described below.

Continuing, the hydrogen dissociation and bonding catalytic metal 120 is coated in a granular form on the surface of the oxidation control layer 110 (step S140). A noble metal such as palladium (Pd) or ruthenium (Ru), for example, is used for the hydrogen dissociation and bonding catalytic metal 120. Granular surfaces that do not contact the oxidation control layer 110 in the hydrogen dissociation and bonding catalytic metal 120 in a granular form become active interfaces in which hydrogen dissociation and bonding becomes active. Also, the coating of the hydrogen dissociation and bonding catalytic metal 120 is carried out with a PVD or other such method. As shown in step S140, it is desirable for the size of the grains in the coating to be 20 nm or less so that they do not bond and become a membrane.

A hydrogen separation membrane 10 is thus produced.

A2. Effects of the Embodiment

According to the manufacturing method for a hydrogen separation membrane of the present embodiment as described above, the hydrogen dissociation and bonding catalytic metal 120 is coated in a granular form on the surface of the oxidation control layer 110 which is formed evenly (step S140). If this is done, granular surfaces not contacting the oxidation control layer 110 in the hydrogen dissociation and bonding catalytic metal 120 become active interfaces, so it is possible to make the surface area of the active interface larger than in a case where the hydrogen dissociation and bonding catalytic metal 120 is formed in a membrane form. Consequently, in the case where the surface area of the active interface of the hydrogen dissociation and bonding catalytic metal 120 is set to the same size as the surface area of the active interface in the case where the hydrogen dissociation and bonding catalytic metal 120 is formed in a membrane form, for example, it is possible to control the quantity of hydrogen dissociation and bonding catalytic metal 120 used better than in the case where the hydrogen dissociation and bonding catalytic metal 120 is formed in a membrane form.

B. Embodiment 2

Figure 2:
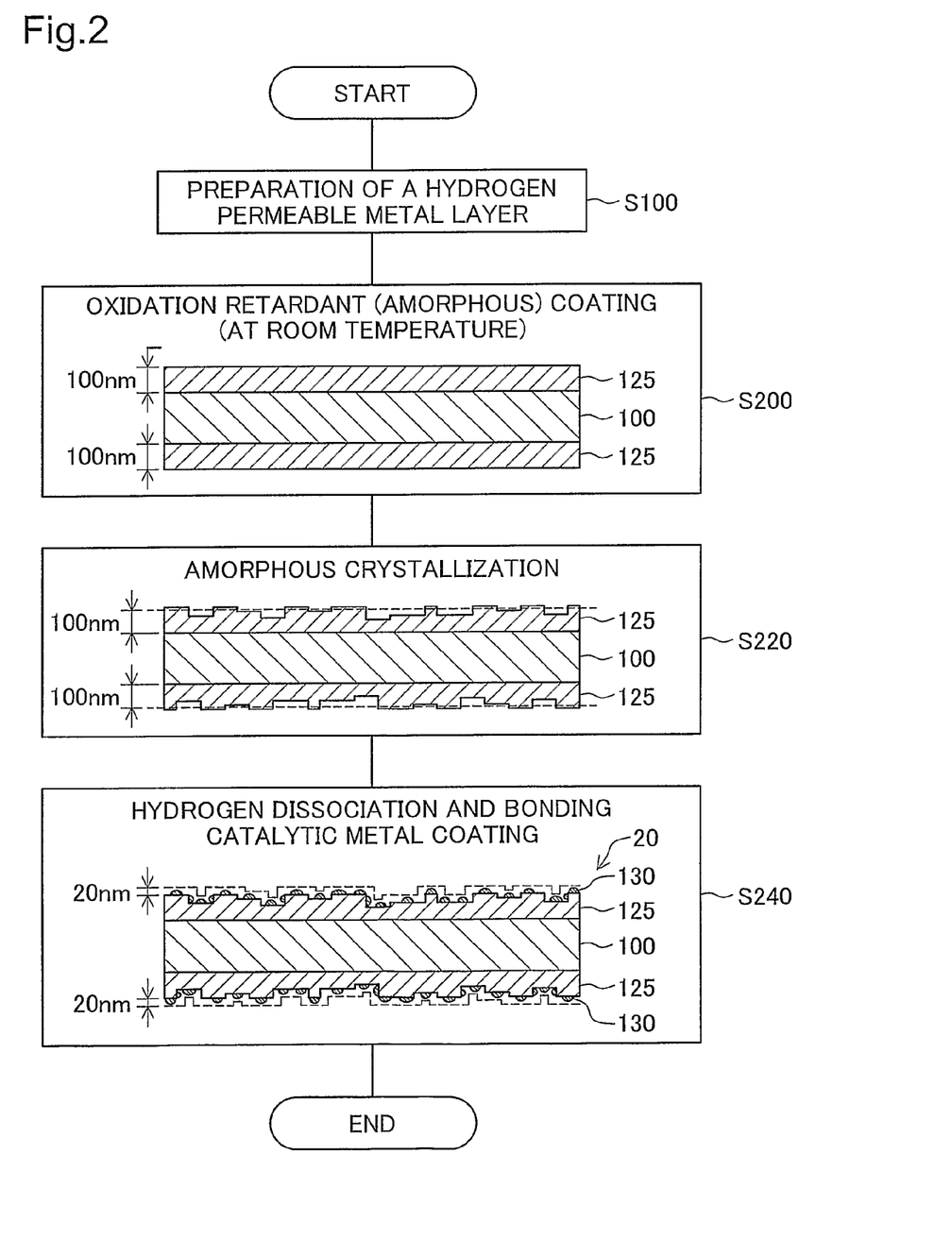
FIG. 2 is a flowchart showing the process for manufacturing a hydrogen separation membrane of Embodiment 2 of the present invention.

Next, Embodiment 2 of the present invention is described. This manufacturing method for a hydrogen separation membrane of the present embodiment is different from the manufacturing method for a hydrogen separation membrane of Embodiment 1 in the below points. Specifically, in Embodiment 1, the oxidation control layer 110 is formed evenly on both surfaces of the hydrogen permeable metal layer 100, and the hydrogen dissociation and bonding catalytic metal 120 is coated on the formed oxidation control layer 110, but in the present embodiment, the oxidation control layer is formed irregularly, and hydrogen dissociation and bonding catalytic metal is coated on the irregular oxidation control layer. The present embodiment is described therefore below focused on the process representing the points different from Embodiment 1.

B1. Manufacturing Method for a Hydrogen Separation Membrane

FIG. 2 is a flowchart showing the process for manufacturing a hydrogen separation membrane in Embodiment 2 of the present invention. Components and so forth formed in each process different from Embodiment 1 are illustrated in the flowchart.

First, the hydrogen permeable metal layer 100 is prepared as the substrate as in Embodiment 1 (step S100).

Next, an oxidation retardant is coated on both surfaces of the hydrogen permeable metal layer 100, which is the substrate, at room temperature (for example, 20° C.), forming an amorphous oxidation control layer 125 (step S200). An agent that allows hydrogen to readily pass through is used as the oxidation retardant. For example, tungsten oxide ($WO_x$), molybdenum trioxide ($MoO_3$), perovskite ($ABO_3$), pyrochlore ($A_2B_2O_7$), or the like may be used. As described above, a PVD method such as ion plating or sputtering is carried out for the coating method of the oxidation control layer 125. As described above, the oxidation retardant is coated at room temperature, but the temperature at which the oxidation retardant is coated may be set arbitrarily within a range at which the oxidation control layer 125 will form amorphously.

Continuing, the amorphous oxidation control layer 125 is crystallized through heat treatment (step S220). For the heat treatment method, laser radiation or the like may be used, for example. In the laser radiation method, heat is generated by the laser radiating on the oxidation control layer 125. Also, it is desirable to carry out the heat treatment at a temperature of around 300 to 500° C. If the oxidation control layer 125 is crystallized as above, the surface of the oxidation control layer 125 will be formed irregularly accompanying crystallization as shown in step S220. In further detail, it is possible to form irregularly the oxidation control layer 125 using physical changes that occur during crystallization of the amorphous oxidation control layer 125. In the present embodiment, the difference between the top of a convex part and the bottom of a concave part in the irregularities (hereinafter referred to as the irregularity difference) is around 10 to 100 nm.

Continuing, a hydrogen dissociation and bonding catalytic metal 130 is coated in a granular form on the surface of the irregular oxidation control layer 125 (step S240 (FIG. 2)). A noble metal such as palladium (Pd) or ruthenium (Ru), for example, may be used as the hydrogen dissociation and bonding catalytic metal 130. Also, the coating of the hydrogen dissociation and bonding catalytic metal 130 is carried out with a PVD or other such method. As shown in FIG. 2 (step S240), it is desirable for the size of the grains in the coating to be 20 nm or less so that they do not bond and become a membrane.

A hydrogen separation membrane 20 is thus produced.

B2. Effects of the Embodiment

Figure 3:
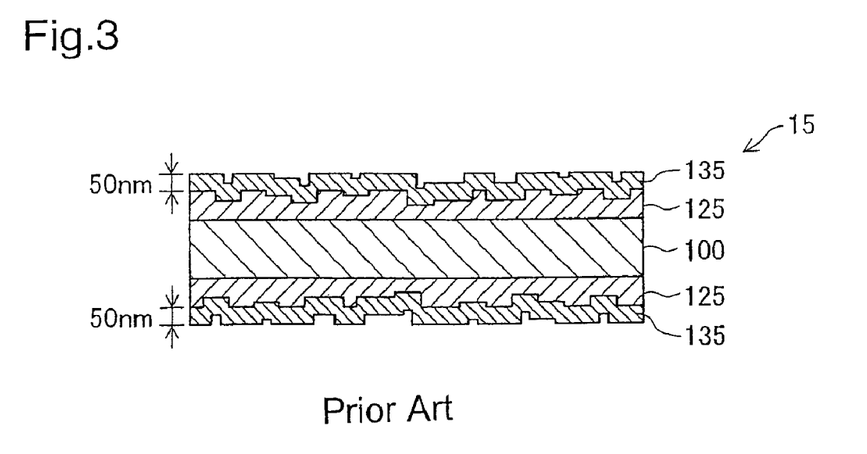
FIG. 3 is a view for explaining a hydrogen separation membrane when hydrogen dissociation and bonding catalytic metal is coated in a membrane form along a surface of an irregular oxidation control layer 125 in a conventional example.

FIG. 3 is a view for explaining the hydrogen separation membrane when the hydrogen dissociation and bonding catalytic metal is coated in a membrane form along the surface of the irregular oxidation control layer 125 as a conventional example. In the figure, a hydrogen separation membrane 15 is shown equipped with a hydrogen dissociation and bonding layer 135 (about 50 nm) formed by coating the hydrogen dissociation and bonding catalytic metal 130 in a membrane form along the surface of the oxidation control layer 125.

Conventionally, the hydrogen dissociation and bonding catalytic metal 130 is coated in a membrane form along the irregular oxidation control layer 125 as in FIG. 3, but according to the manufacturing method for a hydrogen separation membrane of the present embodiment described above, the hydrogen dissociation and bonding catalytic metal 130 is coated in a granular form on the surface of the irregular oxidation control layer 125 (step S240 (FIG. 2)). If this is done, grain surfaces not in contact with the oxidation control layer 125 in the hydrogen dissociation and bonding catalytic metal 130 become active interfaces, so it is possible to make the surface area of the active interface larger than in the case where the hydrogen dissociation and bonding catalytic metal 130 is formed in a membrane form along the irregular oxidation control layer 125 as in FIG. 3. Accordingly, if the surface area of the active interface of the hydrogen dissociation and bonding catalytic metal 130 is set to the same size as that of the active interface in the case where the hydrogen dissociation and bonding catalytic metal 130 is formed in a membrane form, for example, it is possible to control the quantity of the hydrogen dissociation and bonding catalytic metal 130 used better than the case where the hydrogen dissociation and bonding catalytic metal 130 is formed in a membrane form along the irregular oxidation control layer 125.

As described above, the grains of the hydrogen dissociation and bonding catalytic metal 130 are coated on the irregular portions of the oxidation control layer 125, so mutual effects occur less readily, the grains of the hydrogen dissociation and bonding catalytic metal 130 join together, and it is possible to control the phenomenon of cohesion and sintering.

C. Embodiment 3

Figure 4:
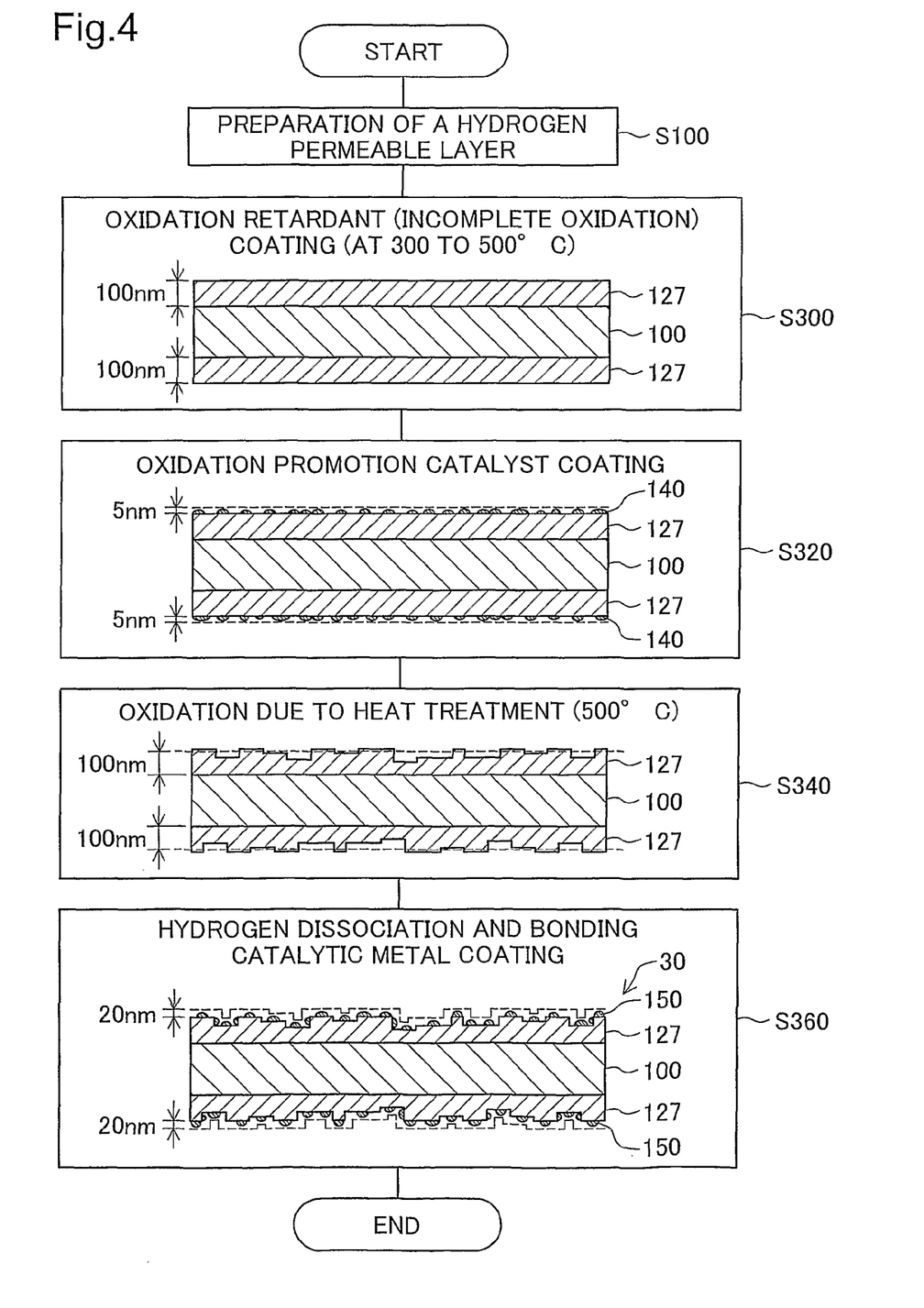
FIG. 4 is a flowchart showing the process for manufacturing a hydrogen separation membrane of Embodiment 3 of the present invention.

Next, Embodiment 3 of the present invention is described. The manufacturing method for a hydrogen separation membrane of the present embodiment differs in the below points from that of Embodiment 2. That is, in Embodiment 2, an amorphous oxidation control layer 125 is formed on the surface of the hydrogen permeable metal layer 100, and that is crystallized to form irregularly the surface of the oxidation control layer 125, but in the present embodiment, an oxidation control layer made from metal oxide whose oxidation is incomplete is formed on the surface of the hydrogen permeable metal layer 100, and that is further oxidized to form irregularly the surface of the oxidation control layer. The present embodiment is accordingly described below focused on the processes representing points differing from Embodiment 2.

C1. Manufacturing Method for a Hydrogen Separation Membrane

FIG. 4 is a flowchart showing the process for manufacturing a hydrogen separation membrane in Embodiment 3 of the present invention. Components and so forth formed in each process different from Embodiment 2 are illustrated in the flowchart.

First, the hydrogen permeable metal layer 100 is prepared as the substrate as in Embodiment 2 (step S100).

Next, an oxidation retardant, which is a metal oxide whose oxidation is incomplete (hereinafter, referred to as an incomplete metal oxide), is coated on both surfaces of the hydrogen permeable metal layer 100, which is the substrate, and an oxidation control layer 127 is formed (step S300). Tungsten oxide whose oxidation is incomplete ($WO_{3-x}$), molybdenum oxide whose oxidation is incomplete ($MoO_{3-x}$), perovskite whose oxidation is incomplete ($ABO_{3-x}$), pyrochlore whose oxidation is incomplete ($A_2B_2O_{7-x}$), or the like, may be used, for example, as the oxidation retardant, which is the incomplete metal oxide. Also, the coating for the oxidation control layer 127 is carried out with a PVD method such as ion plating or sputtering as described above. To avoid the oxidation retardant becoming amorphous, it is desirable to carry out the coating process at a temperature of about 300 to 500° C. In the present embodiment, the thickness of the oxidation control layer 110 is about 100 nm. The thickness may be set arbitrarily according to the use of the hydrogen separation membrane to be produced.

Continuing, an oxidation promotion catalyst 140 is coated in a granular form on the surface of the oxidation control layer 127 (step S320). The oxidation promotion catalyst 140 is for promoting oxidation of the oxidation control layer 127, and platinum (Pt), palladium (Pd), or the like, for example, may be used therefor. If this is done, it is possible to oxidize efficiently when oxidizing the oxidation control layer 127 in the process of step S340 (FIG. 4) described below. Also, for coating the oxidation promotion catalyst 140 a PVD method of the like is carried out. It is desirable to carry out the coating so the grains do not bond and become a membrane, and so that the grain size is 5 nm or less, so most of the oxidation control layer 127 is not covered.

Continuing, the oxidation control layer 127 coated with the oxidation promotion catalyst 140 is heat treated in an air environment for oxidation (step S340 (FIG. 4)). Laser radiation or the like, for example, may be used for the heat treatment method. The temperature at which heat treatment is carried out is about 500° C. If the oxidation control layer 127 is oxidized as above, the surface of the oxidation control layer 127 will be formed irregularly with oxidation as shown in FIG. 4 (step S340). In further detail, it is possible to form irregularly the oxidation control layer 127 made from a metal oxide whose oxidation is incomplete using the physical changes that occur during oxidation. In the present embodiment, the irregularity difference in forming irregularly is from about 10 nm to 100 nm. Also, in the above description, the processing temperature during heat treatment of the oxidation control layer 127 is about 500° C., but this may be set to an arbitrary temperature within a range where the oxidation control layer 127 will oxide.

Next, a hydrogen dissociation and bonding catalytic layer 150 is coated in a granular form on the surface of the irregular oxidation control layer 127 (step S360). A PVD method or the like is carried out for coating the hydrogen dissociation and bonding catalytic metal layer 150. As shown in FIG. 4 (step S360), it is desirable that the size of the grains in the coating are 20 nm or less so that they do not bond and become a membrane.

A hydrogen dissociation membrane 30 is produced as described above.

C2. Effects of the Embodiment

According to the manufacturing method for a hydrogen separation membrane of the present embodiment as described above, the hydrogen dissociation and bonding catalytic layer 150 is coated in a granular form on the surface of the oxidation control layer 127 which is formed irregularly (step S360 (FIG. 4)). If this is done, granular surfaces not in contact with the oxidation control layer 127 become active interfaces in the hydrogen dissociation and bonding catalytic metal 150, so the surface area of the active interface can be made larger than in the case where the hydrogen dissociation and bonding catalytic metal 150 is formed in a membrane form along the irregular oxidation control layer 127. Consequently, in the case where the surface area of the active interface of the hydrogen dissociation and bonding catalytic metal 150, is set at the same size as the surface area of the active interface in the case where the hydrogen dissociation and bonding catalytic metal 150 is formed in a membrane form, for example, it is possible to control the quantity of the hydrogen dissociation and bonding catalytic metal 150 used better than in the case where the hydrogen dissociation and bonding catalytic metal 150 is formed in a membrane form along the irregular oxidation control layer 127.

Also, according to the description above, grains of the hydrogen dissociation and bonding catalytic metal 150 are coated on the irregular portions of the oxidation control layer 127, so mutual effects occur less readily, and it is possible to control the phenomenon of cohesion and sintering of the grains in the hydrogen dissociation and bonding catalytic metal 150.

D. Modifications

The above embodiments are to be considered in all aspects as illustrative and not restrictive. There may be many modifications, changes, and alterations without departing from the scope or spirit of the main characteristics of the present invention.

D1. Modification 1:

The hydrogen separation membranes 10, 20, and 30 produced in the above embodiments may be used in a fuel cell. For example, the fuel cell may have a sandwich construction comprising one of these hydrogen separation membranes M, a prescribed electrode component, and an electrolyte membrane therebetween. In this case, the hydrogen separation membrane M functions as an electrode. Also, the electrolyte membrane has proton (or hydrogen atom) conductivity. It may be constructed with a barium cerate ($BaCeO_3$) or strontium cerate ($SrCeO_3$) ceramic perovskite, $Sm_2Zr_2O_7$, or other ceramic pyrochlore, or Nafion membrane held in by hydrogen permeable metal, or the like, for example. Also, the abovementioned prescribed electrode component may be used to support the catalyst (platinum (Pt), palladium (Pd), ruthenium (Ru), or the like) for promoting an electrode reaction in the conductive porous substance (carbon black or the like), for example, or any of the hydrogen separation membranes 10, 20, or 30 may be used. In the fuel cell, it is desirable to use the above-mentioned hydrogen separation membrane M as the anode electrode, and to use the above-mentioned prescribed electrode component as the cathode electrode.

D2. Modification 2:

In the above embodiments, the hydrogen permeable metal layer 100 prepared as the substrate is constructed from vanadium (V), but the present invention may take a variety of constructions not limited thereto. For example, the hydrogen permeable metal layer 100 may be constructed from niobium (Nb), tantalum (Ta), or other group V metals or an alloy thereof (for example, vanadium (V)-nickel (Ni)). Also, the hydrogen permeable metal layer 100 may be constructed from a plurality of hydrogen permeable metal layers.

D3. Modification 3:

In Embodiment 3 above, an incomplete metal oxide is coated as an oxidation retardant to form the oxidation control layer 127 in the process in step S300 (FIG. 4), but the present invention is not limited thereto. For example, a pure metal such as a compound (AB) constructed from the metals tungsten (W), molybdenum (Mo), and perovskite metal or a compound (AB) constructed from perovskite metal may be coated to form the oxidation control layer 127. If this is done, the oxidation control layer formed from pure metal can be formed irregularly using the physical changes that occur during oxidation. By carrying out the processes from step S320 to step S360 (FIG. 4) as in Embodiment 3 above, it is possible to manufacture a hydrogen separation membrane with effects similar to the hydrogen separation membrane 30.

D4. Modification 4:

In Embodiment 3 and Variant 3 above, the oxidation promotion catalyst 140 is coated to promote oxidation in the oxidation control layer 127 in step S320 (FIG. 4), but this process may be omitted.

The invention claimed is:

1. A method of manufacturing a hydrogen separation membrane, the manufacturing method comprising the steps of:
   (a) forming an oxidation control layer for controlling oxidation of a hydrogen permeable metal layer on a surface thereof; the oxidation control layer being formed by tungsten, molybdenum, perovskite constituent metal, tungsten trioxide ($WO_3$), molybdenum trioxide ($MoO_3$), a ceramic perovskite, or a ceramic pyrochlore, the hydrogen permeable metal layer being used as a substrate,
   (b) attaching catalytic metal having dissociation and bonding reactions of hydrogen activity in a granular form on a surface of the oxidation control layer, and
   (c) forming irregularly a surface of the formed oxidation control layer,
   wherein in the step (a), the oxidation control layer is formed amorphously,
   in the step (b), the catalytic metal having dissociation and bonding reactions of hydrogen activity is caused to attach in a granular form to a surface of the irregular oxidation control layer, and
   in the step (c), the surface of the oxidation control layer is formed irregularly by crystallizing the amorphous oxidation control layer.

2. The manufacturing method in accordance with claim 1, wherein the catalytic metal is caused to attach in the step (b) is a hydrogen permeable metal layer.

3. A method of manufacturing a hydrogen separation membrane, the manufacturing method comprising the steps of:
   (a) forming an oxidation control layer for controlling oxidation of a hydrogen permeable metal layer used as a substrate on a surface thereof;
   (b) attaching catalytic metal having dissociation and bonding reactions of hydrogen activity in a granular form on a surface of the oxidation control layer; and
   (c) forming irregularly a surface of the formed oxidation control layer, and
   wherein in the step (b), the catalytic metal having dissociation and bonding reactions of hydrogen activity is caused to attach in a granular form to a surface of the irregular oxidation control layer,
   in the step (a), the oxidation control layer is formed amorphously, and
   in the step (c), a surface of the oxidation control layer is formed irregularly by crystallizing the amorphous oxidation control layer.

4. A method of manufacturing a fuel cell comprised a hydrogen separation membrane, the manufacturing method comprising the steps of:
   manufacturing a hydrogen separation membrane in accordance with claim 1; and
   (d) forming an electrolyte layer having proton conductivity on a surface of the hydrogen separation membrane.

5. A hydrogen separation membrane comprising:
   a hydrogen permeable metal layer as a substrate;
   an oxidation control layer formed on a surface of the hydrogen permeable metal layer for controlling oxidation thereof, the oxidation control layer being formed by a tungsten trioxide ($WO_3$), molybdenum trioxide ($MoO_3$), a ceramic perovskite, or a ceramic pyrochlore; and
   a hydrogen dissociation bonding activity layer formed by attaching a catalytic metal with hydrogen dissociation and bonding reaction activity in a granular form on a surface of the oxidation control layer, wherein the oxidation control layer is formed amorphously, and
   a surface of the oxidation control layer is formed irregularly by crystallizing the amorphous oxidation control layer.

6. A fuel cell comprising:
   the hydrogen separation membrane in accordance with claim 5; and
   an electrolyte layer formed on a surface of the hydrogen separation membrane and having proton conductivity.

7. A method of manufacturing a hydrogen separation membrane, the manufacturing method comprising the steps of:
   (a) forming an oxidation control layer for controlling oxidation of a hydrogen permeable metal layer on a surface thereof; the oxidation control layer being formed by tungsten, molybdenum, perovskite metal, tungsten trioxide ($WO_3$), molybdenum trioxide ($MoO_3$), a ceramic perovskite, or a ceramic pyrochlore, the hydrogen permeable metal layer being used as a substrate,
   (b) attaching catalytic metal having dissociation and bonding reactions of hydrogen activity in a granular form on a surface of the oxidation control layer, and
   (c) forming irregularly a surface of the formed oxidation control layer,
   wherein in the step (a), the oxidation control layer is formed by a metal oxide whose oxidation is incomplete,
   in the step (b), the catalytic metal having dissociation and bonding reactions of hydrogen activity is caused to attach in a granular form to a surface of the irregular oxidation control layer, and
   in the step (c), the oxidation control layer is formed irregularly by oxidizing the oxidation control layer made from the metal oxide whose oxidation is incomplete.

8. The manufacturing method in accordance with claim 7, wherein the catalytic metal is caused to attach in the step (b) is a hydrogen permeable metal layer.

9. A method of manufacturing a fuel cell comprised a hydrogen separation membrane, the manufacturing method comprising the steps of:
   manufacturing a hydrogen separation membrane in accordance with claim 7; and (d) forming an electrolyte layer having proton conductivity on a surface of the hydrogen separation membrane.

10. A method of manufacturing a hydrogen separation membrane, the manufacturing method comprising the steps of:
   (a) forming an oxidation control layer for controlling oxidation of a hydrogen permeable metal layer used as a substrate on a surface thereof;
   (b) attaching catalytic metal having dissociation and bonding reactions of hydrogen activity in a granular form on a surface of the oxidation control layer; and
   (c) forming irregularly a surface of the formed oxidation control layer, and
   wherein in the step (a), the oxidation control layer is formed by a metal oxide whose oxidation is incomplete, and
   in the step (c), the oxidation control layer is formed irregularly by oxidizing the oxidation control layer made from the metal oxide whose oxidation is incomplete.

11. A hydrogen separation membrane comprising:
   a hydrogen permeable metal layer as a substrate;
   an oxidation control layer formed on a surface of the hydrogen permeable metal layer for controlling oxidation thereof, the oxidation control layer being formed by a tungsten trioxide ($WO_3$), molybdenum trioxide ($MoO_3$), a ceramic perovskite, or a ceramic pyrochlore; and
   a hydrogen dissociation bonding activity layer formed by attaching a catalytic metal with hydrogen dissociation and bonding reaction activity in a granular form on a surface of the oxidation control layer, wherein the oxidation control layer is formed by a metal oxide whose oxidation is incomplete,
   the oxidation control layer is formed irregularly by oxidizing the oxidation control layer made from the metal oxide whose oxidation is incomplete, and
   a surface of the oxidation control layer is formed irregularly by crystallizing the amorphous oxidation control layer.

12. A fuel cell comprising:
   the hydrogen separation membrane in accordance with claim 11; and
   an electrolyte layer formed on a surface of the hydrogen separation membrane and having proton conductivity.

* * * * *